United States Patent
Li et al.

(10) Patent No.: US 10,740,773 B2
(45) Date of Patent: Aug. 11, 2020

(54) SYSTEMS AND METHODS OF UTILIZING MULTIPLE FORECAST MODELS IN FORECASTING CUSTOMER DEMANDS FOR PRODUCTS AT RETAIL FACILITIES

(71) Applicant: Walmart Apollo, LLC, Bentonville, AR (US)

(72) Inventors: Ming Li, Bentonville, AR (US); Rahul Tripathi, Bentonville, AR (US); Anindya S. Dey, Bangalore (IN); Mainak Mitra, Kolkata (IN); Manish K. Barnwal, Burdwan (IN); Mariana Pop, Bentonville, AR (US); Nikesh K. Srivasatava, Bangalore (IN); Stephen Steel, Bentonville, AR (US); Yashas Bharadwaj, Bentonville, AR (US); Aaron Ryan, Rogers, AR (US); Paul Schaefer, Bella Vista, AR (US); Lakshmi Bhaswanth Ramireddy, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 689 days.

(21) Appl. No.: 15/367,530

(22) Filed: Dec. 2, 2016

(65) Prior Publication Data
US 2017/0169446 A1 Jun. 15, 2017

Related U.S. Application Data

(60) Provisional application No. 62/357,099, filed on Jun. 30, 2016, provisional application No. 62/265,369, filed on Dec. 9, 2015.

(51) Int. Cl.
*G06Q 30/02* (2012.01)
*G06Q 10/08* (2012.01)

(52) U.S. Cl.
CPC ....... *G06Q 30/0202* (2013.01); *G06Q 10/087* (2013.01)

(58) Field of Classification Search
CPC .................. G06Q 30/0202; G06Q 10/087
(Continued)

(56) References Cited

U.S. PATENT DOCUMENTS 6,341,271 B1 1/2002 Salvo
6,611,726 B1* 8/2003 Crosswhite ............. G06F 17/18
700/99

(Continued)

FOREIGN PATENT DOCUMENTS

CN 104200279 A 12/2014

OTHER PUBLICATIONS

Capgemini; "Integrated Category Analytics & Insights"; Capgemini, 2013; pp. 1-8.
(Continued)

*Primary Examiner* — Dylan C White
(74) *Attorney, Agent, or Firm* — Fitch, Even, Tabin & Flannery LLP

(57) ABSTRACT

In some embodiments, apparatuses and methods are provided herein useful to forecasting product demand. In some embodiments, a system comprise a forecasting control circuit to: apply each of a plurality of different models to forecast demand of a first product over a first historic period generating historic forecasted demands of the first product, wherein at least a first model uses selected one or more variables that are predicted to have an uncharacteristic effect on predicted demand; select one of the models and apply the model in generating a forecasted future demand, wherein the selection of the model is based on a difference between each of the generated historic forecasted demands and actual sales; and identify actions to modify inventory of the first product at the first shopping facility based on the forecasted future demand.

20 Claims, 3 Drawing Sheets

(58) Field of Classification Search
USPC .................................................. 705/7.31
See application file for complete search history.

(56) References Cited

U.S. PATENT DOCUMENTS

| | | | |
|---|---|---|---|
| 7,080,026 B2 | 7/2006 | Singh | |
| 7,580,852 B2* | 8/2009 | Ouimet | G06Q 10/04 705/35 |
| 7,644,863 B2 | 1/2010 | Chen | |
| 7,716,022 B1 | 5/2010 | Park | |
| 8,027,863 B2* | 9/2011 | Zimmermann | G06Q 10/04 705/7.31 |
| 8,429,033 B2 | 4/2013 | Kreifels | |
| 2002/0169657 A1* | 11/2002 | Singh | G06Q 10/06 705/7.31 |
| 2010/0145864 A1* | 6/2010 | Boesjes | G06Q 10/087 705/80 |
| 2013/0332222 A1* | 12/2013 | Bourgeois | G06Q 10/08 705/7.25 |
| 2014/0156348 A1* | 6/2014 | Sinkel | G06Q 30/0605 705/7.31 |
| 2015/0088606 A1* | 3/2015 | Tyagi | G06Q 30/0202 705/7.31 |
| 2015/0187035 A1 | 7/2015 | Hogan | |

OTHER PUBLICATIONS

GMDH Shell Documentation; "Inventory Planning"; http://d.gmdhshell.com/docs/inventory_planning; Jan. 27, 2015, pp. 1-5.

Software Advice, Inc.; "Compare Inventory Management Software"; https://web.archive.org/web/20150224021317/http://www.softwareadvice.com/inventory_management; Feb. 24, 2015, 5 pages.

Ma, S., Fildes, R., and Huang, T.; "Demand forecasting with high dimensional data: the case of SKU retail sales forecasting with intra- and inter-category promotional information"; Lancaster University: The Department of Management Science; LUMS Working Paper 2014:9, 2014; pp. 1-36.

Mehra, G.; "How Predictive Analytics Is Transforming eCommerce & Conversion Rate Optimization"; https://www.web.archive.org/web/20150407050209/http://conversionxl.com/predictive-analytics-changing-world-retail/?huid=352IDW; Jul. 24, 2014, 15 pages.

Joshi, D., et al, "Preparing for the Big Sale"; https://web.archive.org/web/20150330020245/http:www.business-standard.com/article/management/preparing-for-the-big-sale-114101900663_1.html; Oct. 20, 2014, 9 pages.

Shamir, J.; "Machine Learning: A new tool for better forecasting"; CSCMP's Supply Chain [Quarterly]; http://www.supplychainquarterly.com/topics/Technology/20141230-machine-learning-a-new-tool-for-better-forecasting/; 2014, pp. 1-6.

PCT; App. No. PCT/US2016/065317; International Search Report and Written Opinion dated Mar. 2, 2017.

* cited by examiner

SYSTEMS AND METHODS OF UTILIZING MULTIPLE FORECAST MODELS IN FORECASTING CUSTOMER DEMANDS FOR PRODUCTS AT RETAIL FACILITIES

CROSS-REFERENCE TO RELATED APPLICATION

This application claims the benefit of U.S. Provisional Application No. 62/265,369, filed Dec. 9, 2015, and U.S. Provisional Application No. 62/357,099, filed Jun. 30, 2016, which are incorporated herein by reference in their entirety.

TECHNICAL FIELD

This invention relates generally to product inventory.

BACKGROUND

In modern retail environments, there is a need to improve the customer experience and/or convenience for the customer. In a shopping environment, it can be important that product inventory is readily available to customers. Further, the customer experience at the shopping facility can have significant effects on current sales.

There are many ways to improve customer experience. For example, ready access to products can lead to increased customer visits and customer loyalty. The shopping facility can affect customer experience based in part on finding products of interest, access to a shopping facility, and/or congestion within the shopping facility. Accordingly, it can be advantageous to improve the customers' shopping experience.

BRIEF DESCRIPTION OF THE DRAWINGS

Disclosed herein are embodiments of systems, apparatuses and methods pertaining the forecasting of product demands of millions of products. This description includes drawings, wherein.

Figure 1:
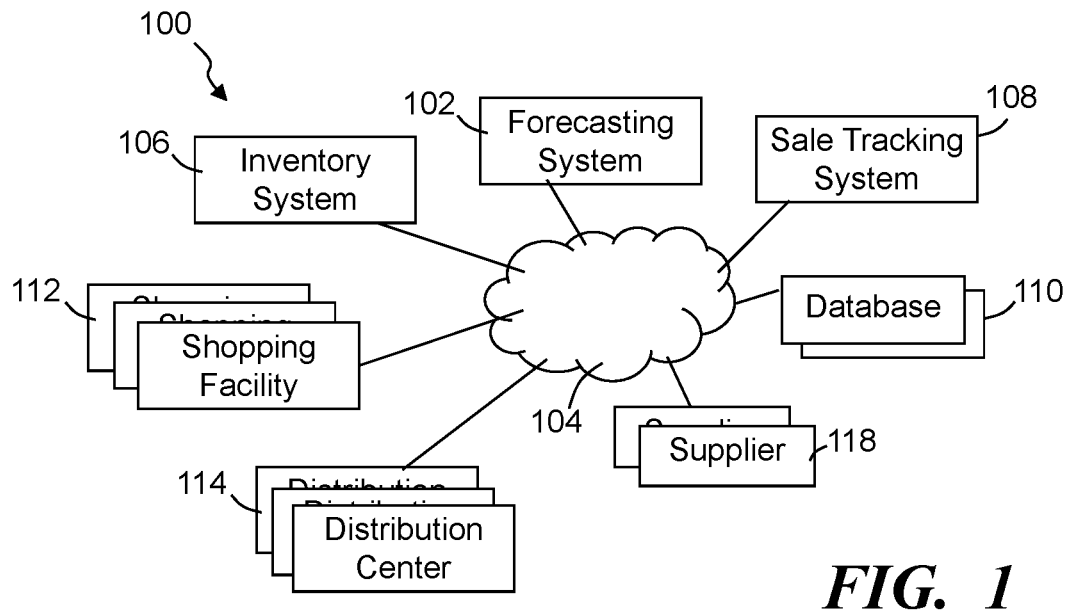
FIG. 1 illustrates a simplified block diagram of an exemplary product distribution control system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to forecast demand of one or more products. Further, the demand can be forecasted for each of multiple products relative to individual stores. Still further, some embodiments attempt to take into consideration uncharacteristic or unusual factors that may uncharacteristically affect demand. In some embodiments, a system is provided that forecasts product demand at retail facilities. The system can comprise a product forecasting system comprising a control circuit configured to apply each of a plurality of different models to forecast demand of a first product over a historic period of time to generate a plurality of different historic forecasted demands of the first product at a shopping facility. Of the plurality of different models, at least a first model uses selected one or more variables, of tens of different variables maintained in a variable database of status data corresponding to each of the tens of different variables, that are predicted to have an uncharacteristic effect on predicted demand of the first product at the shopping facility in generating a corresponding first historic forecasted demand of the different historic forecasted demands. Further, at least a second model does not use the variables maintained in the variable database in generating a corresponding second historic forecasted demand of the different historic forecasted demands. One of the plurality of different models can be selected. In some implementations, the selection of one of the models can be based on a difference between each of the generated historic forecasted demands and actual sales of the first product over the historic period of time. The selected model can be applied in generating a forecasted future demand of the first product at the shopping facility over a fixed future period of time. Based on the forecasted future demand, one or more actions can be identified to modify inventory of the first product at the shopping facility.

In other embodiments, a system can comprise a forecasting control circuit and memory coupled to the control circuit storing computer instructions that when executed by the control circuit cause the control circuit to: maintain a variable database of status data corresponding to each of tens to thousands of different variables that when relevant have an effect on demand of one or more products at a shopping facility of interest, and maintain a status indicating whether each of the tens to thousands of variables is currently relevant to a first product of the one or more products under consideration. A change in status data can be received from the variable database corresponding to selected one or more variables, of the tens to thousands of different variables, that are predicted to have an uncharacteristic effect on predicted demand of the first product at the first shopping facility. A revised demand can be forecasted for at least the first product at the shopping facility of interest by applying a first model using the selected one or more variables, and applying a second model that does not use the one or more variables in confirming an uncharacteristic change in demand. One or more actions can be identified to modify inventory at the shopping facility of interest in response to the forecasted revised demand resulting in part from changes in conditions corresponding to the shopping facility of interest as reflected in the change of status of the selected one or more variables specified in the variable database. This framework enables a demand and sales forecast system to consider external variables to more accurately forecast demand, and/or improve product distribution and enable a more dynamic supply chain that is more responsive to the changing demand by customers due to external forces (e.g., demand anomalies).

FIG. 1 illustrates a simplified block diagram of an exemplary product distribution control system 100, in accordance with some embodiments. The product distribution control system can include a product forecasting system 102 that forecasts future product demand and in some instances forecasts and/or considers future demand for hundreds of thousands of products, or in some applications tens of millions or more products at one or more retail shopping facilities. The forecasting system 102 typically couples over a distributed communication network 104 with one or more inventory systems 106 and one or more sales tracking systems 108. In some embodiments, the forecasting system 102, the inventory system 106 and/or the sales tracking system 108 may further be in communication with one or more databases 110, which may be distributed through multiple different memory devices distributed over the communication network 104.

The forecasting system can utilize information from the inventory system, sales tracking system and/or databases in forecasting demand for products. In forecasting demand, the forecasting system in some implementations attempts to predict uncharacteristic demand of one or more products that results from events, weather, social demand, economic factors and other factors. Tens, to hundreds to thousands of different variables may be tracked that can have an effect on the demand of one or more products. Changes in these variables can result in uncharacteristic demands. For example, changes in forecasted weather can be tracked, and one or more variables associated with the forecasted weather can be used in determining whether such a change is weather may have an effect on demand, and may further forecast a change in demand.

Figure 2:
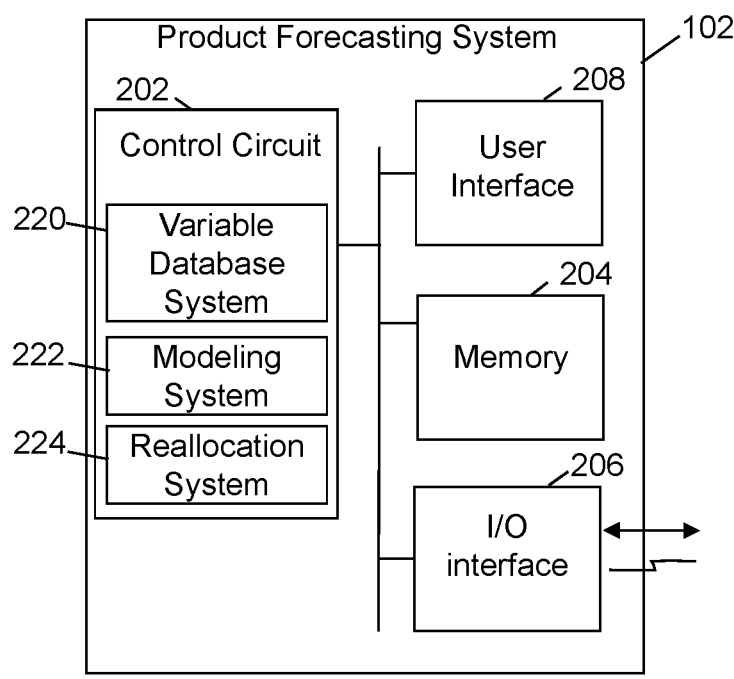
FIG. 2 illustrates a simplified block diagram of an exemplary product forecasting system, in accordance with some embodiments.

FIG. 2 illustrates a simplified block diagram of an exemplary product forecasting system 102, in accordance with some embodiments. The product forecasting system includes a forecasting control circuit and/or system 202, a memory 204 and one or more input/output (I/O) interfaces 206. Typically, the forecasting system further includes a user interface 208 configured to allow users to interact with the product forecasting system.

The control circuit 202 typically comprises one or more processors and/or microprocessors. The control circuit couples with and/or includes the memory 204. Generally, the memory 204 stores the operational code or set of instructions that can be executed by the control circuit 202 and/or processor to implement the functionality of the product forecasting system 102. In some embodiments, the memory 204 may also store some or all of particular data that may be needed to allow the product forecasting, variable database management, modeling, product redistribution, and the like. Such data may be pre-stored in the memory or be received, for example, from the inventory system or systems 106, sales tracking system or systems 108, databases, other sources, or combinations of such sources. It is understood that the control circuit may be implemented as one or more processor devices as are well known in the art. Further, the control circuit may be implemented through multiple processors dispersed over the distributed network 104.

Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 204 is shown as internal to the product forecasting system; however, the memory 204 can be internal, external or a combination of internal and external memory. Additionally, the product forecasting system may include a power supply (not shown) and/or it may receive power from an external source. In some instances, the control circuit 202 and the memory 204 may be integrated together, such as in a microcontroller, application specification integrated circuit, field programmable gate array or other such device, or may be separate devices coupled together. In some applications, the control circuit 202 comprises a fixed-purpose hard-wired platform or can comprise a partially or wholly programmable platform. These architectural options are well known and understood in the art and require no further description here. The control circuit can be configured (for example, by using corresponding programming as will be well understood by those skilled in the art) to carry out one or more of the steps, actions, and/or functions described herein. In some embodiments, the product forecasting system or systems 102 may be implemented through a plurality of computers and/or servers that are distributed over one or more communication networks (e.g., the communication network 104), and may be geographically distributed while still being communicatively coupled to cooperatively operate to perform the functions of the product forecasting system 102.

In some embodiments, the control circuit 202 may further include and/or couple with one or more variable database systems 220, demand modeling systems 222, product reallocation systems 224, and/or other relevant systems. The variable database system, demand modeling system, and product reallocation system may be implemented through hardware, software or a combination of hardware and software. FIG. 2 shows these systems as implemented by the forecasting control circuit 202; however, in other embodiments, one or more of the variable database system, the demand modeling system, and the product reallocation system may be implemented as separate systems with their own control circuits and memory, implemented as part of another system (e.g., inventory system 106, sales tracking system 108, a central control system that provides central control over one or more of the forecasting system 102, and the like), or other such systems.

Further, the product forecasting system 102 may be specifically implemented to forecast products for a single shopping facility (e.g., such as a store location, shopping mall, retail campus, or the like), while in other implementations, the product forecasting system may extend across multiple shopping facility locations. For simplicity, the exemplary embodiments generally described herein are described with respect to a single shopping facility. It will be appreciated by those skilled in the art that some embodiments can be applicable to multiple shopping facilities. Further, the product forecasting system may be operated local at a shopping facility location or remote from the shopping facility location.

The one or more I/O interfaces 206 allow wired and/or wireless communication coupling of the product forecasting system to external components, such as the inventory systems 106, product sales tracking system 108, databases 110, shopping facility systems 112, distribution center systems 114, suppliers 118, and other such components. Accordingly, the I/O interface 206 may include any known wired and/or wireless interfacing device, circuit and/or connecting device, such as but not limited to transceivers, receivers, transmitters, and the like. For example, in some implementations, the I/O interface 206 provides wired communication over a distributed network such as the Internet, WAN, LAN, etc., and/or wireless communication in accordance with one or more wireless protocols (e.g., Wi-Fi, Bluetooth, radio frequency (RF), cellular, other such wireless communication, or combinations of such communication). In some implementations, the I/O interface includes one or more transceivers configured to couple with and receive communications from over the distributed communication network 104.

One or more user interfaces 208 can be included in and/or coupled with the product forecasting system, and can include substantially any known input device, such one or more buttons, knobs, selectors, switches, keys, touch input surfaces and/or displays, etc. Additionally, the user interface may include one or more output display devices, such as lights, visual indicators, display screens, etc. to convey information to a user, such as product forecasting data, variable database information, variables, sales data, history information, product information, recommendations, notifications, errors, conditions and/or other such information. While FIG. 2 illustrates the various components being coupled together via a bus, it is understood that the various components may actually be coupled to the control circuit 202 and/or one or more other components directly.

In some embodiments, the control circuit applies each of a plurality of different models to forecast demand of a product over a historic period of time to generate a plurality of different historic forecasted demands of the product at a shopping facility. Typically, at least a first model of the models applied uses one or more selected variables maintained in the variable database 220. Again, the variable database maintains status data corresponding to each of the different variables that are predicted to have an effect on the predicted demand, and in some instances an uncharacteristic effect on predicted demand of the product at the shopping facility. The first model is applied in generating a corresponding first historic forecasted demand. Further, in some applications at least a second model is applied, where the second model does not use the variables maintained in the variable database in generating a corresponding second historic forecasted demand of the different historic forecasted demands.

One of the models can be selected to be used in forecasting demand of the product. In some applications, the selection of the model is based on a difference between each of the generated historic forecasted demands and actual sales of the product over the historic period of time. For example, the control circuit can determine an error factor for each of the different historic forecasted demands relative to the actual sales of the product. The error factors can be considered, and in some instances, the control circuit selects the model that has a lowest error factor. The selected model is applied in generating a forecasted future demand of the product at the shopping facility over a fixed future period of time. Based on the forecasted future demand, the control circuit can identify one or more actions that can be implemented to modify inventory of the product at the shopping facility.

Some embodiments further evaluate one or more of the historic forecasted demands relative to an additional historic forecasted demand generated by an alternative inventory replenishment application. The alternative inventory replenishment application may consider other information such as typical orders by the shopping facilities, counts received from the shopping facilities and/or other such information. In some embodiments, the alternative replenishment application is a replenishment application that is typically applied by the shopping facility and does not consider the plurality of models or the variables. For example, an alternative replenishment application may be a replenishment application that has historically been applied by the shopping facility. As such, the control circuit can determine error factors for each of the different historic forecasted demands relative to the actual sales of the product. Prior to selecting one of the plurality of models, the control circuit can confirm that an error factor corresponding to one or more of the different models is less than an error factor of the additional historic forecasted demand generated by the alternative inventory replenishment application.

In some embodiments, the control circuit applies each of the plurality of different models to forecast a secondary demand of the product over a second historic period of time that corresponds in duration to the fixed future period of time and generate a plurality of additional different historic forecasted demands of the product at the shopping facility. For example, the system may be attempting to forecast a demand for a future sixteen weeks. The plurality of models can be applied over a first historic period of time (e.g., six months or a year prior to a current time). The models can further be applied over a second historic period of sixteen weeks to forecast secondary demands of the product at the shopping facility over the second historic period of time. An additional error factor can be determined for each of the additional different secondary historic forecasted demands determined for the second historic period of time relative to additional actual sales of the product over the second historic period of time. The control circuit can determine, for one or more of the plurality of different models, a confidence factor based on the corresponding error factor and additional error factor. In selecting the one of the plurality of different models, the control circuit, in some implementations, can comprise that the confidence factor corresponding to one or more of the plurality models has a predefined relationship with a confidence factor threshold. The confidence threshold can be set to avoid making changes to inventory that are not expected to have significant benefit. Additionally or alternatively, the confidence threshold can be dependent on historic evaluations of forecasting and the accuracy of forecastings using the different models, and/or the selected model. In some instances, for example, the confidence factor threshold can be 80%, such that a model being considered would be selected to forecast a future demand of the product when the model achieves a confidence factor based on historic forecasting that is 80% or greater. The confidence factor may be determined as an average of the error factors, a relationship of one or more error factors of the model relative to one or more error factors of one or more other models, a relationship of one or more error factor of a model relative to one or more error factors from an replenishment application, or the like.

As described above, some embodiments in evaluating the plurality of models apply the models to historic data in determining historic forecasts of demand, and then compare that historic forecast to historic actual sales. In some embodiments, however, the control circuit may adjust the historic actual sales based on one or more factors such as inaccurate inventory information, levels on on-hand inventory, out of stock occurrences, abnormal events, a product being placed on discount, and/or other such factors. The control circuit in some applications further adjusts the actual sales as a function of on-hand inventory of the product at the shopping facility over at least a portion of the first historic period. The error factor for each of the different historic forecasted demands can be determined relative to the adjusted actual sales of the first product. For example, if the product was out of stock for a period of time, the actual sales may have been less than what would otherwise have been expected. Accordingly, the actual sales may be adjusted to increase and adjusted actual sales value to a value that is consistent with what would have been expected had the shopping facility not be out of stock of the product.

In some embodiments, the control circuit in selecting one or more variables can select the one or more variables as a function of a residual between historical sales data of a first product relative to a previously forecasted demand forecasted without consideration of the change in status of the one or more variables. Some embodiments select one or more variables based on at least one of a function of historical sales data of a first product, inventory on-hand data of the first product, and a residual between historical sales data of the first product relative to a previously forecasted. Further, in some implementations, the control circuit in selecting the one or more variables has the option to select the one or more variables as a function of a historical sales and on-hand data or a residual between historical sales data of the first product relative to a previously forecasted demand forecasted without consideration of the change in status of the one or more variables.

Some embodiments further apply two sets of models, with each set having one or more models. Each of model of a first set of models uses at least one selected variable in forecasting, while each model of a second set of at least one model does not use the selected one or more variables. Forecasted future demands from each model of the first set of models can be compared to the forecasted future demands determined from each model of the second set of models and/or the other models of the first set in confirming an uncharacteristic change in demand.

The forecasted demands can be performed for each of hundreds of products if not thousands of products that are or may be carried by the shopping facility. Further, the system is typically configured to preform parallel processing so that forecasting of multiple if not all of the various products can simultaneously be performed. In some embodiments, one or more control circuits can operate in parallel to forecast demand of products at one or more other shopping facilities. In some implementations, the one or more control circuits can perform parallel processing in forecasting demand at one or more other shopping facilities independent of predicting whether there is an uncharacteristic demand of hundreds of products at a first shopping facility. The one or more control circuits can receive, for each of the hundreds of products at one or more other shopping facilities and from the variable database, a change in status data corresponding to selected one or more variables, of the tens of different variables, that are predicted to have effects on predicted demand of corresponding ones of the hundreds of products at the one or more other shopping facilities. A forecasted future demand for each of the hundreds of product at the one or more other shopping facility can be forecasted, independent of the other of the hundreds of products, by applying one or more of a set of models using one or more selected variables to historic data relative to the product being forecasted, applying one or more of a set of models that do not use the one or more variables to historic data relative to the product being forecasted, and confirming there is a change in demand for multiple of the hundreds of product relative to the second shopping facility; and identify actions to modify inventory at the second shopping facility relative to each of the multiple of the hundreds of products in response to the forecasted future demand resulting in part from changes in conditions corresponding to the second shopping facility as reflected in the change of status of the selected one or more variables corresponding to each of the one or more of the hundreds of products.

The actions that can be taken to address the forecasted demand can vary. In some implementations, for example, the control circuit evaluates inventory at multiple other shopping facilities relative to an on-hand quantity of a first product at a first shopping facility, and in-stock quantities of the first product at multiple other shopping facilities. A transfer can be initiated of a quantity of the first product from one or more of the multiple other shopping facilities consistent with the forecasted future demand relative to the on-hand quantity of the first product at the first shopping facility. Other actions can include, for example, requesting additional inventory from one or more distribution centers, including distribution centers that typically do not supply product to the first shopping facility, request additional distribution of the first product from a manufacturer, adjust pricing, and other such actions. As described above, in some implementations each of the plurality of different models is trained based on historic sales data and on-hand inventory data obtained over a second historic period of time. In some embodiments, one or more years of historic data is used to train the multiple models. The models can be evaluated relative to actual sales to identify which of the models are providing historic forecasts that are more consistent with the actual sales. Further, the adjust historic sales data, obtained over a period of time, of the first product at the first shopping facility may be adjusted based on determined out of stock occurrences of the first product during the historic period of time. The training of the different models can include training based on the adjusted historic sales.

In some instances, a period of approximately four years of historic data is, with the earliest three years being used to train the models, and the fourth used to generate first or primary historic forecasts and evaluate the accuracy of the trained models. A first error percentage can be generated for each model relative to a particular product and a particular shopping facility. The first error percentage can, in some applications, be determined as a function of the difference between primary historic forecasts and actual sales, relative to the actual sales (e.g., abs(forecast−actual)/actual). Some embodiments further generate a secondary criteria or error factor. This error factor may be determined based on historic forecasts, but limited to a period of time that is similar to or the same as a period of time for which the future forecast is trying to be determined. For example, when attempting to generate a forecasted demand over the next fifteen weeks, secondary historic forecasts are generated for the most recent fifteen weeks of historic data. The secondary historic forecasts can be evaluated relative to actual and/or adjusted actual sales data. Secondary error values may also be determined as a function of the difference between the secondary historic forecasts and the corresponding actual sales over the limited period of time. Some embodiments further consider the error values relative to one or more thresholds. For example, a model would not be considered as a potential future forecasting model unless a primary error values is less than a primary threshold and/or the secondary error value is less than a secondary threshold.

A further apply a third level of criteria in selecting a model. An evaluation of one or more models can be performed by comparing historic forecasts and/or secondary historic forecasts relative to historic forecasts generated using one or more inventory replenishment applications that do not consider the one or more variables. The existing inventory replenishment application can also be used to generate primary and/or secondary historic demands, and primary and secondary error values determined relative to actual and/or adjusted actual sales. Some embodiments limit the selection of a model to those models that have a primary and/or secondary error values that are less than the primary and/or secondary error values of the replenishment application. Further, weightings may be applied to one or more of the criteria and/or the error values, which may in some instances be based on expected accuracies, consistency of models, and/or other such factors.

Figure 3:
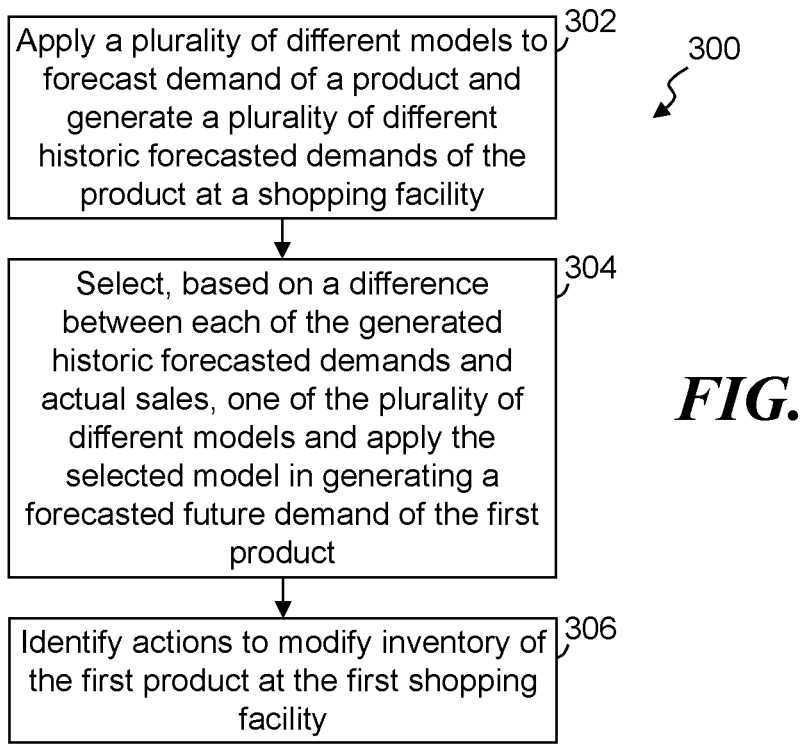
FIG. 3 illustrates a simplified flow diagram of an exemplary process of forecasting product demand at one or more retail facilities, in accordance with some embodiments.

FIG. 3 illustrates a simplified flow diagram of an exemplary process 300 of forecasting product demand at one or more retail facilities, in accordance with some embodiments. It is noted that the below process is describes with reference to a single shopping facility and a single product being evaluated; however, those skilled in the art will appreciate that the process can be performed for one or more products relative to one or more shopping facilities. In some instances, the process can be used to simultaneously evaluate multiple products relative to demand at multiple shopping facilities, while in other implementations the process can be repeated one or more times for each product relative to demand at each individual shopping facility. In step 302, each of a plurality of different models is applied to forecast demand of at least a first product over at least a first historic period of time to generate a plurality of different historic forecasted demands of the first product at one or more shopping facilities. At least one model uses selected one or more variables, of tens of different variables maintained in a variable database of status data corresponding to each of tens of different variables, which are predicted to have an uncharacteristic effect on predicted demand of the first product at least at the shopping facility in generating a corresponding first historic forecasted demand of the different historic forecasted demands. A second model is applied that does not use the variables maintained in the variable database in generating a corresponding second historic forecasted demand of the different historic forecasted demands.

In step 304, one of the plurality of different models is selected and applied in generating a forecasted future demand of the first product at the first shopping facility over a fixed future period of time. The selection of the one model can be based on a difference between each of the generated historic forecasted demands and actual sales of the first product over the first historic period of time. In some embodiments, an error factor is determined for each of the different historic forecasted demands relative to the actual sales of the first product. The selected model often generates a historic forecast corresponding to a lowest error factor. In step 306, one or more actions are identified to modify inventory of the first product at the first shopping facility based on the forecasted future demand.

Some embodiments determine an error factor for each of the different historic forecasted demands relative to the actual sales of the first product. Prior to selecting one of the plurality of different models, the system may confirm that an error factor corresponding to the selected model is less than an error factor of an additional historic forecasted demand generated by an alternative inventory replenishment application. In some embodiments, each of the plurality of different models is applied to forecast a secondary demand of the first product over a second historic period of time that corresponds in duration to the fixed future period of time to generate a plurality of additional different historic forecasted demands of the first product at the first shopping facility. An additional error factor can be determined for each of the additional different historic forecasted demands relative to additional actual sales of the first product over the second historic period of time. A confidence factor can be determined for at least the selected one of the plurality of different models based on the corresponding error factor and additional error factor. The selection of the model can include confirming the confidence factor corresponding to the selected model has a predefined relationship with a confidence factor threshold.

Some embodiments adjust the actual sales as a function of on-hand inventory of the first product at the first shopping facility over at least a portion of the first historic period. Data corresponding to actual sales may be inconsistent with actual demand of the product. For example, actual sales may be less than sales might have been because the shopping facility may have been out of inventory for one or more portions of the historic period. As such, some embodiments adjust the actual sales based at least on determined out of stock occurrences to be more consistent with actual demand. The error factor for each of the different historic forecasted demands can be determined relative to the adjusted actual sales of the first product.

The selection of one or more variables can be selected as a function of a residual between historical sales data of the first product relative to a previously forecasted demand forecasted without consideration of the change in status of the one or more variables. In some embodiments the selection the one or more variables includes an option to select the one or more variables as a function of a historic sales and on-hand data or a residual between historical sales data of the first product relative to a previously forecasted demand forecasted without consideration of the change in status of the one or more variables.

Some embodiments apply a first set of two or more models that use the selected one or more variables, and apply a second set of two or more models that do not use the one or more variables. Forecasted future demands from each model of the first set of models are compared to forecasted future demands determined from each model of the second set of models and/or one or more of the forecasted future demands from models of the first set in confirming an uncharacteristic change in demand.

Some embodiments, in parallel and independent of predicting whether there is an uncharacteristic demand of hundreds of products at the first shopping facility, further receive, for each of the hundreds of products at a second shopping facility, a change in status data corresponding to selected one or more variables, of the tens of different variables, that are predicted to have effects on predicted demand of corresponding ones of the hundreds of products at the second shopping facility. A forecasted future demand for each of the hundreds of product at the first shopping facility can be forecasted, in parallel to and independent of the forecasting of the demand of the first product, by applying one or more of a set of models using the selected one or more variables to historic data relative to the product being forecasted, applying one or more of a set of models that do not use the one or more variables to historic data relative to the product being forecasted, and confirming there is a change in demand for multiple of the hundreds of product relative to the second shopping facility. Actions can be identified to modify inventory at the first shopping facility relative to each of the multiple of the hundreds of products in response to the forecasted future demand resulting in part from changes in conditions corresponding to the first shopping facility as reflected in the change of status of the selected one or more variables corresponding to each of the one or more of the hundreds of products.

Further, some embodiments, in parallel and independent of predicting whether there is a change in demand of one or more products at a first shopping facility, further evaluate changes in demand, including uncharacteristic changes in demand, of products at multiple different shopping facilities. In some applications, a change in status data corresponding to selected one or more variables, of the tens of different variables, that are predicted to have effects on predicted demand of corresponding ones of the hundreds of products are received, for each of the hundreds of products at one or more other shopping facilities. A forecasted future demand for each of the hundreds of product at each of the one or more other shopping facilities can be forecasted, independent of the other shopping facilities, by applying one or more of a set of models using the selected one or more variables to historic data relative to each product being forecasted, applying one or more of a set of models that do not use the one or more variables to historic data relative to each product being forecasted, and confirming there is a change in demand for one or more of the hundreds of product relative to one or more of the other shopping facilities. Actions can be identified to modify inventory at each of the one or more other shopping facilities relative to each of the multiple of the hundreds of products in response to the forecasted future demand resulting in part from changes in conditions corresponding to shopping facilities as reflected in the change of status of the selected one or more variables corresponding to each of the one or more of the hundreds of products.

In some embodiments, inventory is evaluated at multiple other shopping facilities relative to an on-hand quantity of the first product at the first shopping facility, and in-stock quantities of the first product at multiple other shopping facilities. A transfer of a quantity of one or more products can be initiated from one or more of the multiple other shopping facilities consistent with the forecasted future demand relative to the on-hand quantity of the first product at the first shopping facility. Some embodiments train each of the plurality of different models based on historic sales data and on-hand inventory data obtained over a second historic period of time.

Figure 4:
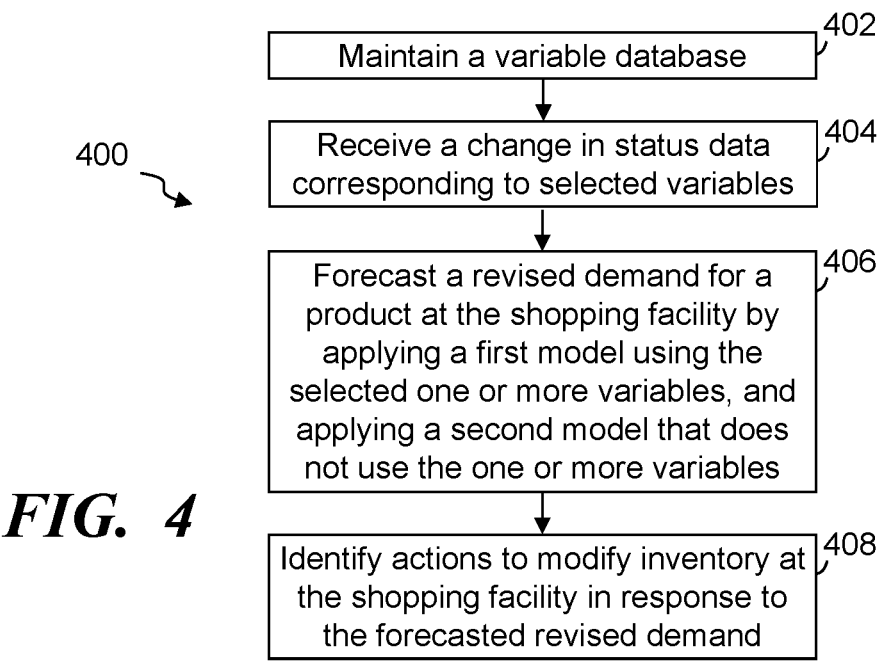
FIG. 4 illustrates a simplified flow diagram of an exemplary process of forecasting product demand at one or more retail facilities, in accordance with some embodiments.

FIG. 4 illustrates a simplified flow diagram of an exemplary process 400 of forecasting product demand at one or more retail facilities, in accordance with some embodiments. It is noted that the below process is describes with reference to a single shopping facility and a single product being evaluated; however, those skilled in the art will appreciate that the process can be performed for one or more products relative to one or more shopping facilities. In some instances, the process can be used to simultaneously evaluate multiple products relative to demand at multiple shopping facilities, while in other implementations the process can be repeated one or more times for each product relative to demand at each individual shopping facility.

In step 402, a variable database is maintained of tens to hundreds or thousands of different variables, and status data corresponding to each of the variables is further maintained. The status data, at least in part, indicates whether each of the variables of the variable database is currently relevant to one or more particular products of the tens to millions of potential products under consideration. Some embodiments evaluate variable data correspond to each of the different variables and/or potential variables in determining a statistical relevance of the variable data with respect to whether a condition corresponding to each of the multiple of the tens to thousands of different variables is predicted to have an uncharacteristic effect on the predicted demand of the first product at the first shopping facility. Many of the variables may be related and/or dependent. Further, in some instances, the variables may be considered according to one or more categories such as, but not limited to, weather, events, trends, and other such categories. Events can be substantially any event that may have an effect on a particular shopping facility (e.g., elections, concerts, sporting events, start of school, holiday, change of seasons, social media, youth sports, parades, national and/or regional celebrations, sports playoffs, catastrophes (local and/or remote), news events, and the like). Further, trends may be local, regional, state, national, multi-national and the like. Further, many of the variables may be dependent on one or more other variables. Still further, one or more variables may correspond to one or more categories. In some instances, variables are identified based on knowledge of workers and/or others associated with a shopping facility or chain of shopping facilities. Often these works have significant knowledge about factors that can have an effect on demand. This knowledge can be collected and incorporated into the variable database as multiple different variables and/or weights to be applied to variables and/or modeling.

The variables, when relevant, have an effect on demand of one or more products at one or more shopping facilities. Further, some of the variables correspond to instances that result in uncharacteristic demand on one or more products at one or more shopping facilities. For example, forecasted and/or current weather conditions can have a significant effect on demand that is outside of typically demands. As a specific example, when a hurricane is forecasted to travel close to and/or over one or more geographic regions the demand for some products may drastically increase relative to the product (e.g., water, toilet paper, batteries, generators, flashlights, canned goods, rain protective clothing, etc.), and demand for some products may drop below typical levels (e.g., beach chairs, frozen foods, outdoor toys, etc.). As another example, an event occurring near a shopping facility (e.g., sporting event, music concert, fireworks display, parade, rally, start of school, etc.) can similarly uncharacteristically affect demand of one or more products at one or more shopping facilities than if the event was not taking place. Accordingly, the variable database tracks tens to hundreds or thousands of variables and information corresponding to states of those variables regarding whether such states may have an effect on product demands.

In step 404, a change in status data is received corresponding to selected one or more variables that are predicted to have an uncharacteristic effect on predicted demand of a product being evaluated relative to a shopping facility. The change in status may be represented as a change in a state (e.g., change from an "inactive" state to an "active" state), a value change (e.g., value proportional to the variable), a change in weighting or scale, or other such change in status. Further, the status and/or state of the variables may be modified in accordance with conditions and/or parameters relative to the variable (e.g., rain is expected or not, amount of expected rain is greater than a threshold amount of typical rainfall amounts, temperature is greater than a threshold of trending high temperatures (e.g., over the last week, over the last two weeks, etc.), and the like). Some variables may be dependent upon and/or correspond to one or more other variables. For example, some variables may be a lead or lag indicator corresponding to one or more other variables that indicate that the predicted effect on demand is expected to lead or lag the event or condition that may cause the uncharacteristic demand by one or more threshold periods of time. As such, some embodiments maintain one of a leading and lagging indicator variable relative to each of multiple of the different variables indicative that the corresponding variable is associated with a leading or lagging effect on demand of the product at the shopping facility. Additionally or alternatively, the state of variables may be modified by one or more algorithms to define a relativity of that value and/or information relative to effects on sales. Further, as introduced above, the state and/or status may be determined as a relativity to expected, predicted and/or trending conditions.

In some embodiments, the one or more variables are selected as a function of changes in one or more of the status of the potential variables, historic sales of the product relative to each of the potential variables, and an on-hand inventory of the product at the shopping facility at the time of forecasting the revised demand and/or at a time in the future for which the demand is being forecasted. For example, a determined demand may predict demand for several weeks or months into the future (e.g., 10, 17, 20 weeks, or more in the future). Additionally or alternatively, in some implementations the selection of the one or more variables can include selecting the one or more variables as a function of a residual between historical sales data of the product being evaluated relative to a previously forecasted demand forecasted without consideration of the change in status of the one or more variables. In some embodiments, one or more known selection techniques and/or algorithms can be used in selecting the one or more variables. For example, some embodiments apply a Least Absolute Shrinkage and Selection Operator (LASSO) algorithm and/or process relative to the variable database in selecting the one or more variables. Other embodiments may alternatively or additionally apply an Elastic Net or other variable selection mechanism. In some applications, the variable selection algorithm and/or process may further take into consideration historical sales data of the product, current and historic on-hand inventory data at the shopping facility for the product, residual historical sales data, and/or other such factors. The on-hand inventory may be limited to just the quantity at the shopping facility. In other instances, the on-hand quantity may include additional considerations such as product in route and/or scheduled for delivery at the shopping facility. The residual historical sales data can be determined, in some instances, as the residual between the historical sales data and a current forecasted demand for the product at the shopping facility while not taking into consideration the information available through the variables of the variable database. The historical sales data, current and historical on-hand inventory data, residual historical sales data, and the like may be provided by the sales tracking system 108, the inventory system 106 and/or other such sources. The sales tracking system 108, the inventory system 106 and/or other such sources may be implemented and maintained local at the shopping facility, or implemented remote from the shopping facility. Additionally, in some applications the sales tracking system 108 and/or the inventory system 106 may be implemented through one or more systems that track sales and/or inventory of more than a single shopping facility.

The variable selection process (e.g., using a LASSO process) identifies zero to several potential variables that are expected to have an effect on the demand of the product, and typically an uncharacteristic demand of the product. The selection can be based on historical data that corresponds to the selected variables having an effect on changes in demand, and often atypical changes in demand, which may include abnormal spikes in demand. As such, historically these variables are relevant to and often important to the demand of the product. Typically, the selection of zero variables through the selection process is an indication that this particular product is predicted not to be affected by the variables in the variable database. Thus, with respect to this product, there would not be an unexpected change and/or a change beyond typical changes in demand for the product. Accordingly, it would be expected that standard demand forecasting, without the use of the variable database and modeling, would be accurate.

In step 406, a revised demand is forecasted for the product being evaluated for the shopping facility. In some embodiments, the revised demand is determined in part by applying one or more models using the selected one or more variables. Some embodiments additionally apply one or more different modelings that do not use the selected one or more variables in confirming a change and/or an uncharacteristic change in demand. In some instances, two or more models can independently be applied to the selected variables and corresponding variable data in forecasting the demand. For example, some embodiments may apply dynamic linear modeling with regressor, Autoregressive Integrated Moving Average (ARIMA) modeling with regressor, other such regressive modeling, or other such modeling. Further, some embodiments apply one or more other modelings that are performed without regression. For example, some embodiments apply one or more of exponential smoothing (e.g., Holt-Winters method), standard ARIMA modeling, dynamic linear modeling without regression, and other such modeling. Again, one or more of these modelings can be applied and results and/or error factors corresponding to modeling can be compared to the one or more modelings that take into consideration the variables and the corresponding variable data in confirming a change in demand. Additionally or alternatively, some embodiments evaluate and/or compare the results and/or error factors from the multiple different models, and a selection of one of the models can be confirmed and used to forecast revised demand and/or a change in demand. Some embodiments, for example, apply a first set of two or more models where each of the two or more models of the first set of model uses the selected one or more variables, apply a second set of two or more models where each of the two or more models of the second set of models do not use the one or more variables, and compare forecasted demand from each model of the first set of models or a combination of the first set of models to forecasted demand determined from each model of the second set of models or a combination of the second set of models in confirming an uncharacteristic change in demand.

Some embodiments may select one of the outputs of the modeling as the forecasted demand. The selection may be based on a historic evaluation of modeling of similar variables and a corresponding historic accuracy relative to the same or similar variables. Other implementations may determine a forecasted demand based on the output of two or more modelings. The two or more outputs can be averaged, a mean can be determined, weightings can be applied and/or other factors can be applied in determining the forecasting. The weightings can be determined based on historical accuracy of forecasting based on the modeling and/or the accuracy based on various weightings to the two or more modeling outputs. The forecasted results may define a forecasted demand over one or more weeks at a shopping facility for the product of interest. For example, in some implementations, the results provide a forecast for 5, 17, 25 or more weeks.

Some embodiments apply multiple modelings as part of a process selecting a model predicted to provide the most accurate results in determining a revised forecasted demand of a product relative to at least one shopping facility. In some implementations, for example, historic sales of the product for which a forecasted demand is being determined can be utilized as part of an evaluation process of each of multiple models in forecasting demand of a product. Additionally or alternatively, historic sales are utilized as part of model training for one or more of the forecasting models that are being applied and evaluated.

As described above, and further below, some embodiments apply a first set of one or more forecasting models that utilize the selected one or more variables in forecasting demand, and further apply a second set of one or more forecasting models that do not take into consideration the selected one or more variables in forecasting demands. For each model to be considered, historic sales over a period of time for the product being forecasted can be used to train these models as is under in the art. The training may take into consider months, a year or multiple years of historical sales. By utilizing years of sales date, the training considers changes in seasonal effects on demand. Some embodiments evaluate the multiple trained models to identify a model that is predicted to provide the most accurate forecasting results. In some applications, each model is applied to a first period of historic time (e.g., the last year, the last six months, the last two years, etc.) and the resulting historic forecasted demand determined from each model can be compared to actual historic sales over the first historic period. A first error factor can be determined for each model of the two sets of models (e.g., difference between historic forecasted demand of the product over the historic period and actual sales of the product over the historic period, divided by actual sales over the historic period, to provide a first error factor as a percentage).

Still referring to FIG. 4, in step 408 one or more actions are identified to modify inventory at the shopping facility in response to the forecasted revised demand resulting in part from changes in conditions corresponding to the shopping facility as reflected in the change of status of the selected one or more variables specified in the variable database. The actions can include substantially any relevant action such, as but not limited to, determining whether additional inventory of the product can be shipped from one or more distribution centers (e.g., through communication with an inventory system of the distribution center systems 114), one or more other shopping facilities (e.g., through communication with an inventory system of the shopping facility systems 112), one or more suppliers 118, one or more third party sources, or the like, limiting sales, increasing pricing, identifying one or more similar products that may additionally be received at the shopping facility, and other such actions. Some embodiments further evaluate remote inventory at a distribution center, one or more other shopping facilities, suppliers, third party sources, other such sources, or combination of two or more of such sources. Some embodiments further evaluate one or more of these external inventories relative to an on-hand quantity of the product being evaluated at the shopping facility of interest. This can include evaluating in-stock quantities of the product at the multiple other shopping facilities, the distribution center(s), and other such sources. Based on this evaluation, a transfer can be initiated of a quantity of the product from one or more of the other sources (e.g., one or more of the multiple other shopping facilities) consistent with the revised demand relative to the on-hand quantity of the product at the shopping facility.

In some embodiments, the forecasting control circuit is further configured to, in parallel and independent of predicting whether there is an uncharacteristic demand of hundreds to millions of products at the shopping facility, receive for each of the hundreds to millions of products at the first shopping facility, a change in status data corresponding to selected one or more variables, of the tens to thousands of different variables, that are predicted to have uncharacteristic effects on predicted demand of corresponding ones of the hundreds to millions of products at the first shopping facility. A revised demand is forecasted, independent of the other of the hundreds to millions of products, for each of the hundreds to millions of product at the first shopping facility by applying one or more of a set of models using the selected one or more variables, applying one or more of a set of models that do not use the one or more variables, and confirming there is an uncharacteristic change in demand for multiple of the hundreds to millions of product relative to the first shopping facility. One or more actions are identified to modify inventory at the first shopping facility relative to each of the multiple of the hundreds to millions of products in response to the forecasted revised demand resulting in part from changes in conditions corresponding to the first shopping facility as reflected in the change of status of the selected one or more variables corresponding to each of the one or more of the hundreds to millions of products.

Again, the actions can include one or more actions that can attempt to satisfy the determined demand. In some instances, the forecasting control circuit evaluates inventory at multiple other shopping facilities relative to an on-hand quantity of the product of interest at the shopping facility being considered, and in-stock quantities of the product at multiple other shopping facilities. The in-stock quantities can include substantially any stock at the shopping facility including stock that is on the sales floor. In some instances the in-stock quantities may be equivalent to an on-hand quantity. In other instances, may be limited to product that has not been moved to the sales floor, may not include scheduled deliveries, and/or other differences. A transfer may be initiated of a quantity of the product from one or more of the multiple other shopping facilities consistent with the revised demand relative to the on-hand quantity of the first product at the shopping facility being evaluated.

The forecasting system can provide forecasting for different products numbering in the order of several million, and relative to numerous different shopping facilities, while the computation time is within hours. Further, the forecasting can utilize the combination of internal sales data along with external variables through a variable database. The variable database can be generated and maintained through a systematic way to include retail-related features. The variables can correspond to current external forces, such as but not limited to weather, events, trends, and/or other such forces. When evaluating a demand of a product, one or more variables are selected through one or more selection algorithms (e.g., LASSO) at product and store level choose relevant variables from variable database. The corresponding variable data of the selected external variables are utilized relative to and/or incorporated in the time series forecast through modeling, and typically multiple different modeling methods. One or more product demand exceptions or anomalies are defined based on the forecasted results from the modeling. Actions can be identified and one or more of those actions can be applied (e.g., through a user interface) to the one or more current supply chains and/or inventory at one or more remote potential product sources (e.g., distribution centers, other shopping facilities, suppliers, etc.) to meet the exceptions. Some embodiments further take into consideration and/or consolidate online demand (typically relative to a region in which the shopping facility is located) as well as shopping facility demand for more efficient product reallocation and/or supply chain control.

As described above with reference to FIGS. 1-2, the forecasting system 102 can include one or more control circuits 202 and memory 204 that provide at least part of the functionality to forecast uncharacteristic demand based on one or more of hundreds or thousands of different variables. The forecasting system can further be implemented through multiple systems and/or sub-systems to provide added scalability of the system. The scalability in part increases the processing capabilities of the forecasting system allowing substantially simultaneous forecasting for large numbers of stores (e.g., 100 or more). Further, the scaling can include scaling the potential product to reduce the number of products that are fully modeled to determine whether there is a forecasted uncharacteristic demand.

In some instances, for example, there may be tens of millions of products that could be considered and for which demand could be forecasted. The scaling can in part filter the potential products to identify which are relevant to a time being forecasted. This scaling typically significantly reduces the number of potential products to be considered, and in some instances reduces the number of potential products to be considered by less than half and in some applications to less than 25%. The scaling may further reduce the potential products may performing a forecasting on at least some of these products without applying external variables and obtain initial relevant forecasting. Further filtering may be applied based on the determined forecasting. For example, many of the products may have insufficient data to provide an effective forecasting. As a particular example, for many products there may be insufficient sales data to generate a meaningful or statistically reliable forecast. As such, the number of products to be considered can be further reduced, and in some instances is further reduced by half or more. The variable selection process can then be applied that can result in an identification of many products for which zero variables are selected and/or there are no changes to variable data which indicates a lack of effect of these external forces on the particular product and/or at the particular shopping facility. Accordingly, such products are not further considered, which provides further scaling and reduces the number of products to a reduced set of potential products (e.g. in some instances reducing from tens of millions to approximately tens to hundreds of thousands of products) that are being affected by external variables and for which an uncharacteristic demand may be predicted to result.

This scaling allows the total number of potential products to significantly be reduces, which results in significantly less computational processing in forecasting demand for potential products. Based on the reduced set of potential products the modeling can be performed using two or more different modeling algorithms where at least one modeling takes into consideration the selected variables, and one modeling does not take into consideration the selected variables on the reduced set of products. As such, the computational processing is significantly scaled down because the modeling is applied to only a relatively small percentage of all the potential products. In some instances, the products that are considered may be less than 5%, and often is less than 1%.

The scaling can additionally or alternatively further scale hardware and/or software that is used to implement the evaluation of the potential products and the forecasting of the reduced set of potential products. Typically, the forecasting system 102 is implemented through multiple control circuits and/or processing systems that may be located together and/or distributed over a communication network 104 (e.g., WAN, LAN, Internet, etc.). Some embodiments employ a framework that implements multiple clusters. As clusters are increased the computational processing time is reduced, and in some instances is linearly reduced as a function of the number of nodes of clusters that are brought on line. Still further, the forecasting system in some embodiments is implemented through parallel processing such that each product at each store is considered independent of each other. As such, the processing for the forecasting of a first product is not dependent on the forecasting of another product. Additionally, the forecasting for numerous different products can be performed simultaneously in parallel through one or more clusters and/or nodes of clusters.

Some embodiments receive, in parallel and independent of predicting whether there is an uncharacteristic demand of hundreds or tens of thousands of products at the shopping facility, for each of the reduced set of potential products at the shopping facility, a change in status data corresponding to selected one or more variables, of the tens to thousands of different variables, that are predicted to have uncharacteristic effects on predicted demand of corresponding ones of the hundreds to millions of products at the first shopping facility. A revised demand can then be forecasted, independent of the other of the potential products, for each of the reduced set of potential product at the shopping facility by applying one or more of a set of models using the selected one or more variables. Further, one or more of a set of models that do not use the one or more variables can be applied. Based on the results of these modelings, the forecasting system can confirm there is an uncharacteristic change in demand for multiple of the potential product relative to the shopping facility. Further, some embodiments identify actions to modify inventory at the shopping facility relative to each of the multiple products in response to the forecasted revised demand resulting in part from changes in conditions corresponding to the shopping facility as reflected in the change of status of the selected one or more variables corresponding to each of the potential products.

In some embodiments, the variable database is created and/or maintained through one or more algorithms that are implemented relative to each shopping facility. For example, the variable database may be created and maintained in R/Python environments and each shopping facility will have a unique variable database to reflect the features of each store. The scalability of the forecasting system enables the time to create the variable database to often be within is a few hours, with updating and collecting external data being continuously implemented over time. The variable selection and time series forecast with selected external variables algorithm can, in some applications, is implemented for example in Hadoop/Hive/R environment. In such an application, the variable selection for multiple stores, and in some instances 400 or more stores, can be achieved in a few hours. The scalability can increase the number of stores that can be evaluated and/or have variables selected to substantially any number of stores while still achieving variable selection for those stores within a few hours. The modeling is applied to obtain a determine forecast demand for a particular product at a particular store. The determined demand may be accessible to one or more users and/or entities. For example, the forecasted demand may be displayed through a user interface to one or more users (e.g., replenish managers, store managers, regional managers, etc.). Further, in some implementations the forecasted demand is used to interference with current supply chain to determine product availability and reallocation to those stores with the determined priority based in part on the forecasted demand.

Further, the scalability allows the forecasting system to be able to run the multiple modelings for the products at the shopping facility for which there is sufficient data and for which one or more variables are selected and correspond to potential changes in demand resulting from the external forces and/or factors. Typically, the modeling for the reduced set of potential products at multiple different shopping facilities can be performed within a day and often within a few hours (e.g., less than five hours). The forecasting system provides a systematic way to create and/or maintain the variable database for hundreds or thousands of retail-related external variables, and a systematic way for variable selection and integration and automation of the variable selection algorithm with time series forecast algorithm with selected variables. The forecasting can further provide a consolidated view of online demand and store demand. The variables allow the forecasting to integrate exceptions and anomalies with current supply chains to be more dynamic and responsive to enable products reallocation and availability in the shopping facilities when customers have demand due to the impact of these external forces.

Figure 5:
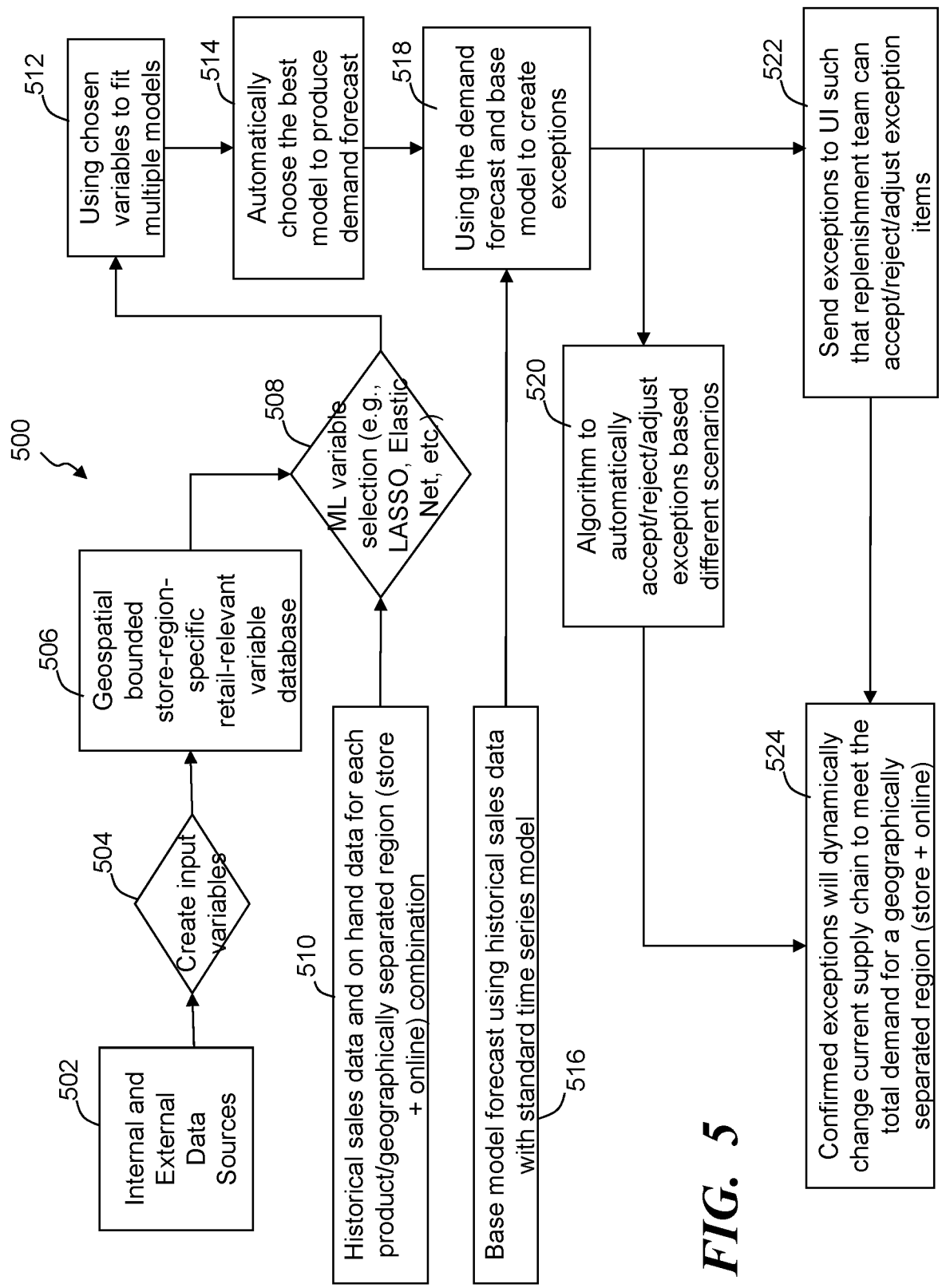
FIG. 5 illustrates a simplified flow diagram of a process of forecasting uncharacteristic demand and/or forecasting demand based on external forces, exceptions and/or anomalies, in accordance with some embodiments.

FIG. 5 illustrates a simplified flow diagram of a process 500 of forecasting uncharacteristic demand and/or forecasting demand based on external variables, exceptions and/or anomalies, in accordance with some embodiments. In step 502, potential variables and/or corresponding information that can be used to identify potential variables are identified and evaluated to create the variable database. The information can include structured data, unstructured data, social media data, and other such information. Further, the variable data can include interdependencies between variables, relevance of information and/or how information of a variable is relative to current trends and/or variations from norms, and the like. The variables may be categorized and/or identified based on categories of information such as but not limited to weather category, event category, and other such categories. The identification of variables and/or variable information can be continuous as further information becomes available and/or a relevance of information is further appreciated.

In step 504, the potential variables are evaluated to determine their relevance to a particular shopping facility and/or one or more products at that shopping facility to determine which variables should be included in constructing and/or maintaining the variable database. In some implementations, each category of variables can define a subset of the variable database, with each category having numerous variables. In step 506, a variable database is defined that is typically specific to a particular shopping facility and/or the geographic region in which the shopping facility is location.

In step 508, the variables of the variable database are evaluated to select zero to many variables that are expected to have an effect on the forecasting of demand. Some embodiments include step 510 where historical sales data and/or on-hand data is determined and/or received for each product at the shopping facility and may be utilized in the variable selection. Further, some embodiments consider historical sales data and/or on-hand data for a geographic region which can include shopping facility and on-line sales and/or on-hand data. The selection process may include the application of a LASSO algorithm, an Elastic Net algorithm or process, other such variable selection processes, or combination of such selection processes (e.g., selecting those overlapping selected variables).

In step 512, the selected variables are utilized in one or more models in forecasting the demand of the product being considered. Further, one or more models are additionally performed that do not take into consideration the one or more selected variables. This can be used, in some instances, as a verification of a determined forecast. In step 514, one or more of the results from the different modeling are selected to produce the forecasted uncharacteristic demand. The selection of the one or more models can be based on historical accuracy. Further, weightings may be applied when two or more models are considered.

Some embodiments include step 516 where a baseline forecasted demand, determined without considering the external variables, is determined and/or received. In step 518, the base line forecasted demand can be compared to the determined uncharacteristic demand. The comparisons may confirm the uncharacteristic demand and/or identify potentially faulty forecastings. This can also take into consideration lead and lag time expectancies. Based on the determined forecasted demand taking into consideration the variables, one or more actions can be determined in step 520 that are consistent with expected scenarios, and in step 522 where workers provide additional input and/or overrides. In step 524, the one or more actions are initiated (e.g., reallocation and/or redistribution, etc.).

In some embodiments, systems, apparatuses and methods are provided to enhance inventory and inventory distribution to accommodate uncharacteristic demand. Some embodiments provide systems to forecast product demand at retail facilities, comprising: a product forecasting system comprising a control circuit and memory storing computer instructions that when executed cause the control circuit to: apply each of a plurality of different models to forecast demand of a first product over a first historic period of time to generate a plurality of different historic forecasted demands of the first product at a first shopping facility, wherein: at least a first model uses selected one or more variables, of tens of different variables maintained in a variable database of status data corresponding to each of the tens of different variables, that are predicted to have an uncharacteristic effect on predicted demand of the first product at the first shopping facility in generating a corresponding first historic forecasted demand of the different historic forecasted demands, and at least a second model does not use the variables maintained in the variable database in generating a corresponding second historic forecasted demand of the different historic forecasted demands;

select one of the plurality of different models and apply the selected one of the models in generating a forecasted future demand of the first product at the first shopping facility over a fixed future period of time, wherein the selection of the one of the plurality of different models is based on a difference between each of the generated historic forecasted demands and actual sales of the first product over the first historic period of time; and identify actions to modify inventory of the first product at the first shopping facility based on the forecasted future demand.

Some embodiments provide methods of forecasting product demand at retail facilities, comprising: by a control circuit: applying each of a plurality of different models to forecast demand of a first product over a first historic period of time to generate a plurality of different historic forecasted demands of the first product at a first shopping facility, wherein at least a first model uses selected one or more variables, of tens of different variables maintained in a variable database of status data corresponding to each of tens of different variables, that are predicted to have an uncharacteristic effect on predicted demand of the first product at the first shopping facility in generating a corresponding first historic forecasted demand of the different historic forecasted demands; and at least a second model does not use the variables maintained in the variable database in generating a corresponding second historic forecasted demand of the different historic forecasted demands; selecting one of the plurality of different models and applying the selected one of the models in generating a forecasted future demand of the first product at the first shopping facility over a fixed future period of time, wherein the selection of the one of the plurality of different models is based on a difference between each of the generated historic forecasted demands and actual sales of the first product over the first historic period of time; and identifying actions to modify inventory of the first product at the first shopping facility based on the forecasted future demand.

Some embodiments provide systems to forecast product demand at retail facilities, comprising: a product forecasting system comprising a forecasting control circuit and memory coupled to the control circuit storing computer instructions that when executed by the control circuit cause the control circuit to: maintain a variable database of status data corresponding to each of tens to thousands of different variables that when relevant have an effect on demand of one or more products at a first shopping facility, and maintain a status indicating whether each of the tens to thousands of variables is currently relevant to a first product of the one or more products under consideration; receive, from the variable database, a change in status data corresponding to selected one or more variables, of the tens to thousands of different variables, that are predicted to have an uncharacteristic effect on predicted demand of the first product at the first shopping facility; forecast a revised demand for the first product at the first shopping facility by applying a first model using the selected one or more variables, and applying a second model that does not use the one or more variables in confirming an uncharacteristic change in demand; and identify actions to modify inventory of the first product at the first shopping facility in response to the forecasted revised demand resulting in part from changes in conditions corresponding to the first shopping facility as reflected in the change of status of the selected one or more variables specified in the variable database.

Some embodiments provide methods of forecasting product demand at retail facilities, comprising: by a forecasting control circuit: maintaining a variable database of status data corresponding to each of tens to thousands of different variables that when relevant have an effect on demand of one or more products at a first shopping facility, and maintain a status indicating whether each of the tens to thousands of variables is currently relevant to a first product of the one or more products under consideration; receiving a change in status data corresponding to selected one or more variables, of the tens to thousands of different variables, that are predicted to have an uncharacteristic effect on predicted demand of the first product at the first shopping facility; forecasting a revised demand for the first product at the first shopping facility by applying a first model using the selected one or more variables, and applying a second model that does not use the one or more variables in confirming an uncharacteristic change in demand; and identifying actions to modify inventory of the first product at the first shopping facility in response to the forecasted revised demand resulting in part from changes in conditions corresponding to the first shopping facility as reflected in the change of status of the selected one or more variables specified in the variable database.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to forecast product demand at retail facilities, comprising:
   a product forecasting system comprising a control circuit and memory storing computer instructions that when executed cause the control circuit to:
   apply, for each of hundreds of different products, each of a plurality of different models to forecast demand of a first product over a first historic period of time to generate a plurality of different historic forecasted demands of the first product at a first shopping facility, wherein: at least a first model uses selected one or more variables, of tens of different variables maintained in a variable database of status data corresponding to each of the tens of different variables, that are predicted to have an uncharacteristic effect on predicted demand of the first product at the first shopping facility in generating a corresponding first historic forecasted demand of the different historic forecasted demands, and at least a second model does not use the variables maintained in the variable database in generating a corresponding second historic forecasted demand of the different historic forecasted demands;
   select one of the plurality of different models and apply the selected one of the models in generating a forecasted future demand of the first product at the first shopping facility over a fixed future period of time, wherein the selection of the one of the plurality of different models is based on a difference between each of the generated historic forecasted demands and actual sales of the first product over the first historic period of time;
   identify at least a first action to modify inventory of the first product at the first shopping facility based on the forecasted future demand, comprising identifying a quantity of the product to be transferred to the first shopping facility based on the forecasted future demand and relative to an on-hand quantity of the product at the first shopping facility, and identify one or more other shopping facilities from which the quantity of the first product is to be transferred; and carry out at least the first action initiating a transfer, from the one or more other shopping facilities, of the quantity of the first product to the first shopping facility and reallocating and redistributing the quantity of the first product to the first shopping facility consistent with and satisfying the forecasted future demand of the first product at the first shopping facility.

2. The system of claim 1, wherein the control circuit is further configured to determine an error factor for each of the different historic forecasted demands relative to the actual sales of the first product, where a first error factor corresponding to the selected model has a lowest error factor.

3. The system of claim 1, wherein the control circuit is further configured to:

determine an error factor for each of the different historic forecasted demands relative to the actual sales of the first product; and confirm, prior to selecting the one of the plurality of different models, that the first error factor corresponding to the selected one of the plurality of different models is less than an error factor of an additional historic forecasted demand generated by an alternative inventory replenishment application.

4. The system of claim 1, wherein the control circuit is further configured to:

determine an error factor for each of the different historic forecasted demands relative to the actual sales of the first product over the first historic period of time;

apply each of the plurality of different models to forecast a secondary demand of the first product over a second historic period of time that corresponds in duration to the fixed future period of time to generate a plurality of additional different historic forecasted demands of the first product at the first shopping facility;

determine an additional error factor for each of the additional different historic forecasted demands relative to additional actual sales of the first product over the second historic period of time; and determine, for at least the selected one of the plurality of different models, a confidence factor based on the corresponding error factor and additional error factor wherein the selection of the one of the plurality of different models comprises confirming the confidence factor corresponding to the selected one of the plurality models has a predefined relationship with a confidence factor threshold.

5. The system of claim 4, wherein the control circuit is further configured to adjust the actual sales as a function of on-hand inventory of the first product at the first shopping facility over at least a portion of the first historic period, wherein the determining the error factor for each of the different historic forecasted demands determines the error factor relative to the adjusted actual sales of the first product.

6. The system of claim 5, wherein the control circuit in selecting the one or more variables selects the one or more variables as a function of a residual between historical sales data of the first product relative to a previously forecasted demand forecasted without consideration of the change in status of the one or more variables.

7. The system of claim 1, wherein the control circuit further applies a first set of two or more models comprising the first model, wherein each of the two or more models of the first set of models uses the selected one or more variables; applies a second set of two or more models comprising the second model, wherein each of the two or more models of the second set of models do not use the one or more variables; and compares forecasted future demand from each model of the first set of models to forecasted future demand determined from each model of the second set of models in confirming an uncharacteristic change in demand.

8. The system of claim 1, wherein the control circuit is further configured to, in parallel and independent of predicting whether there is an uncharacteristic demand of the first product at the first shopping facility:

receive, for each of the hundreds of products at the first shopping facility and from the variable database, a change in status data corresponding to selected one or more variables, of the tens of different variables, that are predicted to have effects on predicted demand of corresponding ones of the hundreds of products at the first shopping facility;

forecast, independent of the other of the hundreds of products, a forecasted future demand for each of the hundreds of product at the first shopping facility by: applying one or more of a set of models using the selected one or more variables to historic data relative to the product being forecasted, applying one or more of a set of models that do not use the one or more variables to historic data relative to the product being forecasted, and confirming there is a change in demand for multiple of the hundreds of product relative to the first shopping facility; and identify one or more additional actions to modify inventory at the first shopping facility relative to each of the multiple of the hundreds of products in response to the forecasted future demand resulting in part from changes in conditions corresponding to the first shopping facility as reflected in the change of status of the selected one or more variables corresponding to each of the one or more of the hundreds of products.

9. The system of claim 1, wherein the control circuit is further configured to evaluate inventory at multiple other shopping facilities, comprising the one or more other shopping facilities, relative to the on-hand quantity of the first product at the first shopping facility, and in-stock quantities of the first product at the multiple other shopping facilities; and initiate the transfer of the quantity of the first product from the one or more shopping facilities of the multiple other shopping facilities consistent with the forecasted future demand relative to the on-hand quantity of the first product at the first shopping facility and the inventory at the multiple other shopping facilities.

10. The system of claim 1, wherein the control circuit is further configured to train each of the plurality of different models based on historic sales data and on-hand inventory data obtained over a second historic period of time.

11. A method of forecasting product demand at retail facilities, comprising:

by a control circuit:

applying, for each of hundreds of different products, each of a plurality of different models to forecast demand of a first product over a first historic period of time to generate a plurality of different historic forecasted demands of the first product at a first shopping facility, wherein at least a first model uses selected one or more variables, of tens of different variables maintained in a variable database of status data corresponding to each of tens of different variables, that are predicted to have an uncharacteristic effect on predicted demand of the first product at the first shopping facility in generating a corresponding first historic forecasted demand of the different historic forecasted demands; and at least a second model does not use the variables maintained in the variable database in generating a corresponding second historic forecasted demand of the different historic forecasted demands;

selecting one of the plurality of different models and applying the selected one of the models in generating a forecasted future demand of the first product at the first shopping facility over a fixed future period of time, wherein the selection of the one of the plurality of different models is based on a difference between each of the generated historic forecasted demands and actual sales of the first product over the first historic period of time;

identifying at least a first action to modify inventory of the first product at the first shopping facility based on the forecasted future demand, comprising identifying a quantity of the product to be transferred to the first shopping facility based on the forecasted future demand and relative to an on-hand quantity of the product at the first shopping facility, and identifying one or more other shopping facilities from which the quantity of the first product is to be transferred; and carrying out at least the first action comprising initiating a transfer, from the one or more other shopping facilities, of the quantity of the first product to the first shopping facility and reallocating and redistributing the quantity of the first product to the first shopping facility consistent with and satisfying the forecasted future demand of the first product at the first shopping facility.

12. The method of claim 11, further comprising:
determining an error factor for each of the different historic forecasted demands relative to the actual sales of the first product, where a first error factor corresponding to the selected model has a lowest error factor.

13. The method of claim 11, further comprising:
determining an error factor for each of the different historic forecasted demands relative to the actual sales of the first product; and
confirming, prior to selecting the one of the plurality of different models, that the first error factor corresponding to the selected one of the plurality of different models is less than an error factor of an additional historic forecasted demand generated by an alternative inventory replenishment application.

14. The method of claim 11, further comprising:
determining an error factor for each of the different historic forecasted demands relative to the actual sales of the first product;
applying each of the plurality of different models to forecast a secondary demand of the first product over a second historic period of time that corresponds in duration to the fixed future period of time to generate a plurality of additional different historic forecasted demands of the first product at the first shopping facility;
determining an additional error factor for each of the additional different historic forecasted demands relative to additional actual sales of the first product over the second historic period of time; and
determining, for at least the selected one of the plurality of different models, a confidence factor based on the corresponding error factor and additional error factor wherein the selection of the one of the plurality of different models comprises confirming the confidence factor corresponding to the selected one of the plurality models has a predefined relationship with a confidence factor threshold.

15. The method of claim 14, further comprising:
adjusting the actual sales as a function of on-hand inventory of the first product at the first shopping facility over at least a portion of the first historic period, wherein the determining the error factor for each of the different historic forecasted demands comprises determining the error factor relative to the adjusted actual sales of the first product.

16. The method of claim 15, wherein the selecting the one or more variables comprises selecting the one or more variables as a function of a residual between historical sales data of the first product relative to a previously forecasted demand forecasted without consideration of the change in status of the one or more variables.

17. The method of claim 11, wherein the forecasting further comprises:
applying a first set of two or more models comprising the first model, wherein each of the two or more models of the first set of model uses the selected one or more variables;
applying a second set of two or more models comprising the second model, wherein each of the two or more models of the second set of models do not use the one or more variables; and
comparing forecasted future demand from each model of the first set of models to forecasted future demand determined from each model of the second set of models in confirming an uncharacteristic change in demand.

18. The method of claim 11, further comprising:
in parallel and independent of predicting whether there is an uncharacteristic demand of the first product at the first shopping facility:
receiving, for each of the hundreds of products at the first shopping facility, a change in status data corresponding to selected one or more variables, of the tens of different variables, that are predicted to have effects on predicted demand of corresponding ones of the hundreds of products at the first shopping facility;
forecasting, independent of the other of the hundreds of products, a forecasted future demand for each of the hundreds of product at the first shopping facility by applying one or more of a set of models using the selected one or more variables to historic data relative to the product being forecasted, applying one or more of a set of models that do not use the one or more variables to historic data relative to the product being forecasted, and confirming there is a change in demand for multiple of the hundreds of product relative to the first shopping facility; and
identifying one or more additional actions to modify inventory at the first shopping facility relative to each of the multiple of the hundreds of products in response to the forecasted future demand resulting in part from changes in conditions corresponding to the first shopping facility as reflected in the change of status of the selected one or more variables corresponding to each of the one or more of the hundreds of products.

19. The method of claim 11, further comprising:
evaluating inventory at multiple other shopping facilities, comprising the one or more other shopping facilities, relative to the on-hand quantity of the first product at the first shopping facility, and in-stock quantities of the first product at the multiple other shopping facilities; and wherein the initiating the transfer comprising initiating the transfer of the quantity of the first product from the one or more shopping facilities of the multiple other shopping facilities consistent with the forecasted future demand relative to the on-hand quantity of the first product at the first shopping facility and the inventory at the multiple other shopping facilities.

20. The method of claim 11, further comprising:
training each of the plurality of different models based on historic sales data and on-hand inventory data obtained over a second historic period of time.

* * * * *